Aug. 19, 1969    R. V. MATHISON    3,461,475
WINDSHIELD WASHER APPARATUS
Filed July 10, 1967    2 Sheets-Sheet 1
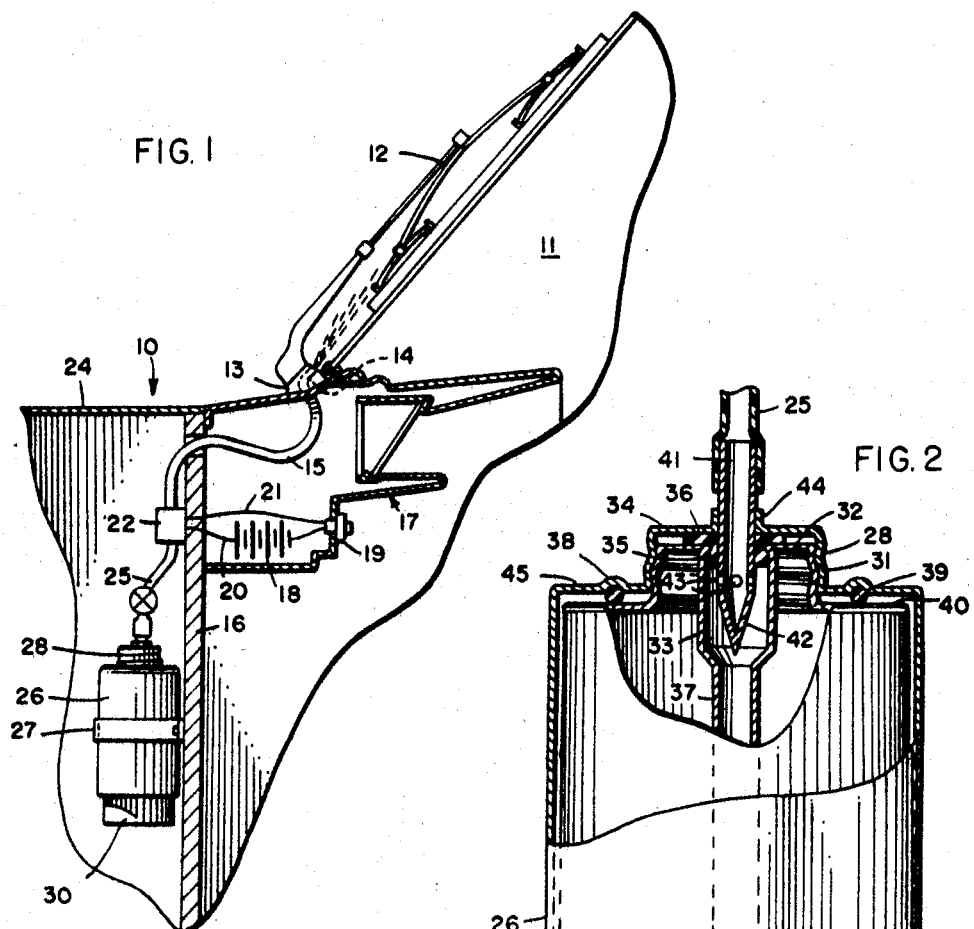
INVENTOR:
ROBERT V. MATHISON
BY
Marzall, Johnston, Cook & Root
ATT'YS Aug. 19, 1969  R. V. MATHISON  3,461,475
WINDSHIELD WASHER APPARATUS
Filed July 10, 1967  2 Sheets-Sheet 2
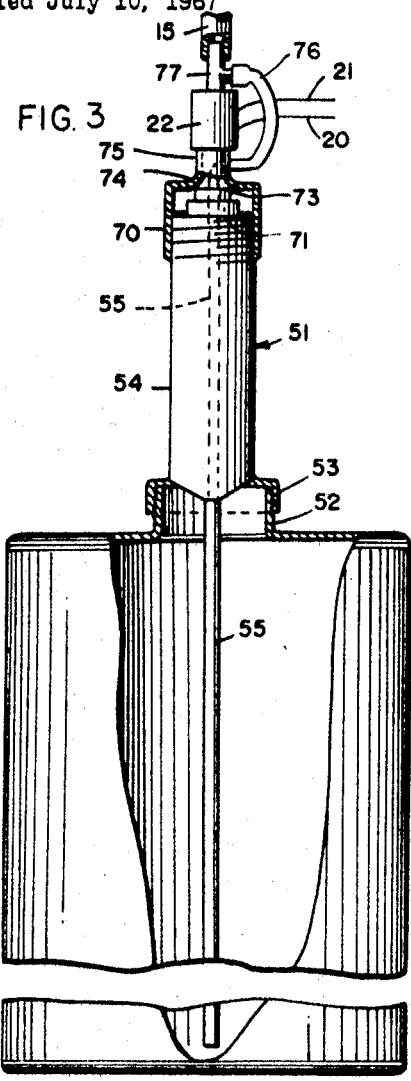
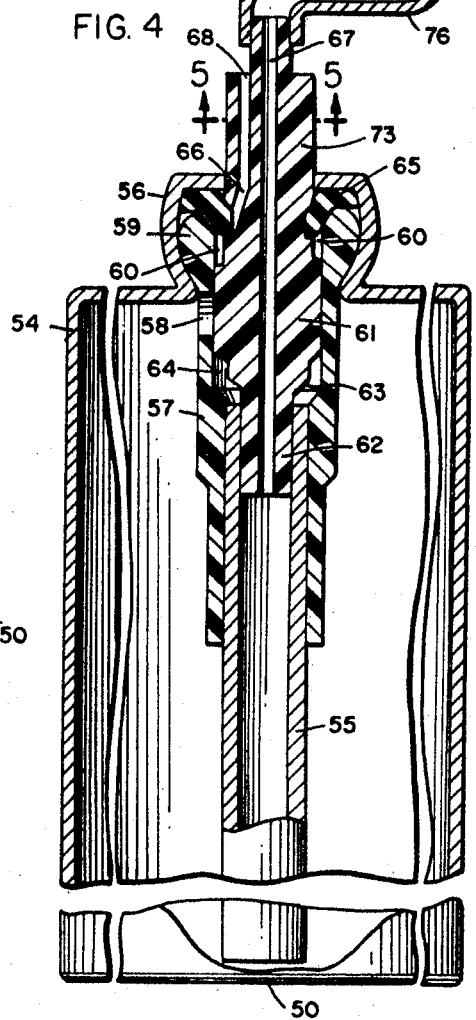
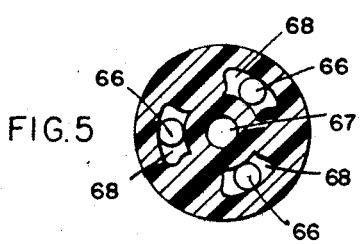
INVENTOR:
ROBERT V. MATHISON
BY
Marzall, Johnston, Cook & Root
ATT'YS

United States Patent Office 3,461,475
Patented Aug. 19, 1969

3,461,475
WINDSHIELD WASHER APPARATUS
Robert V. Mathison, 5 Woodcrest Road,
Asheville, N.C. 28804
Filed July 10, 1967, Ser. No. 652,191
Int. Cl. B60s 1/48; B67b 7/24
U.S. Cl. 15—250.01     5 Claims

ABSTRACT OF THE DISCLOSURE

Windshield washer apparatus utilizing aerosol cartridges containing washing liquid or separate propellent gas cartridge and washing liquid vessel for spraying washing liquid on windshield wherein cartridge is replaceable when exhausted.

Background of the invention

The invention herein is primarily concerned with improvements in windshield washing apparatus through the utilization of gas-pressurized aerosol units or propellent gas units for causing washing liquid to be conveyed and sprayed onto a windshield for the purpose of washing the same. The apparatus herein comprises a replaceable liquid-aerosol cartridge or gas propellent cartridge, the former containing a mixture of the pressurized gas and the washing liquid and the latter cartridge containing the pressurized gas alone in association with a separate container for the liquid. The apparatus herein is a type wherein the spraying action is initiated by the driver of the vehicle for the purpose of cleaning the windshield by spraying it with a washing liquid and activating the windshield wipers.

Windshield washers are extensively used. A popular type in present use comprises a flexible packet or envelope constituting the reservoir for the washing liquid in combination with a pump and conduit and spray nozzles for spraying the liquid on the windshield upon activation of the switch on the dashboard of the vehicle by the driver. Such switches may be separate units or may be switches tied in with the windshield wiper activating switch.

The invention herein departs from prior art practice by the use of replaceable aerosol or propellent gas cartridges. Such cartridges can be carried as stock items in automotive garages, service stations, and the like, whereby the cartridges containing the propellent gas, e.g., a Freon, or both the gas propellent and the washing liquid may be purchased and quickly mounted as a replacement for the exhausted cartridge.

Summary of the invention

The invention herein comprises an improvement in the combination of windshield washing apparatus having a reservoir of washing liquid mounted under the hood of the automobile, conduit means for conveying the washing liquid to the vicinity of the base of the windshield, and a spray nozzle or nozzles at the terminal end of the conduit means for spraying the washing liquid on the windshield, in further combination with switch-operated means for activating the spraying upon activation of a switch by the driver of the automobile. The improvement herein resides in the use, as the source of the washing liquid, of an aerosol-type reservoir which is readily replaceable when exhausted of washing liquid, and/or propellant gas. The aerosol cartridge may comprise a pressure type cartridge containing both the washing liquid and the gas propellent, or may comprise a replaceable cartridge containing the gas propellent alone in association with a liquid reservoir vessel.

The aerosol cartridge contains a puncturable seal or a valve structure adapted to be opened for flow of the aerosol spray when the cartridge is mounted in the apparatus under the hood of the automobile. Upon puncturing of the seal or opening of the valve, the windshield washer unit is charged up to a valve in the conduit between the liquid reservoir and the spray nozzle. Upon opening of this valve, e.g., a solenoid valve, by activation of the switch, the gas propelled liquid is conveyed by the conduit and discharged through the nozzles onto the windshield.

Description of the drawings

Two preferred embodiments of the invention are illustrated in the drawings, wherein:

FIG. 1 is a fragmentary view in side elevation, partly in cross section, of the automobile in the vicinity of the windshield, dashboard, and fire wall;

FIG. 2 is a side elevation, partly in cross section, of the aerosol cartridge-receiving holder and liquid-aerosol cartridge mounted therein;

FIG. 3 is a side elevation, with a portion thereof broken away, of a second embodiment characterized by a liquid reservoir vessel with a propellent gas cartridge mounted on a liquid reservoir vessel;

FIG. 4 is a broken, cross-sectional view of the gas cartridge, and particularly illustrates the detail of the valve structure therein;

FIG. 5 is a sectional view taken on the section plane 5—5 of FIG. 4.

Description of preferred embodiments

There is shown in FIG. 1 a segment of an automobile 10 comprising a fragment of the windshield 11, a windshield wiper 12, and a windshield wiper hub 13, mounted in the usual manner on the automobile adjacent the bottom of the windshield. The hub 13 may have a passage and nozzle 14 for spraying liquid on to the windshield. Conversely, the spray nozzles may be separate from the hub 13. All of these elements are generally known in the art.

The nozzle 14 is connected by a tube or hose 15 and may extend through the fire wall 16 of the automobile in any suitable fashion. The dashboard 17 may have therein a button 19 for actuating a solenoid valve 22. The electrical connection for the solenoid valve and button are shown diagrammatically in the form of the battery 18 and the wires 21 and 22. It is to be understood that the button 19 and solenoid valve 22 are usually connected to the ignition system of the automobile.

The aerosol member or cartridge is most conveniently mounted under the hood 24 of the automobile, and is connected by a hose 25 to the solenoid valve 22. It may be mounted, as shown in FIGS. 1 and 2, in an open-bottomed cylindrical holder 26 mounted by bracket 27 to the fire wall 16, or at any other convenient place under the hood of the automobile.

The replaceable aerosol cartridge 30 threads into the threaded neck 28 of the holder 26 by its threaded neck 31. The neck 31 has a top ring 32 from which depends an enlarged, upper, tubular segment 33. The upper end of the enlarged tubular segment 33 is closed by a puncturable, elastomer seal 35 having an annular lip 36. When the cartridge 30 is threaded into the holder 26, the ring or lip 36 is compressed between the upper ring wall 32 of the cartridge and upper ring wall 34 of the holder.

The cartridge 30 is filled with a washing liquid which may be water, water containing a detergent, or either of the foregoing in combination with an anti-freeze liquid such as methanol, ethanol, ethylene glycol, or the like. The cartridge 30 is gas-tight and a tubular member 37 extends from the enlarged tubular section 33 downwardly into proximity of the bottom of the cartridge 30. Thus, the gaseous propellent will urge the liquid to flow into the lower end of the tubular segment 37 when the solenoid valve 22 is open.

The neck 28 has a tube 41 rigidly mounted in the annular flange 44. The tube 41 has a pointed end 42 which will puncture the elastomer seal 35 when the seal is pressed thereagainst upon insertion of the cartridge 30 into the holder 26. The lower portion of the tube 41, which penetrates below the elastomer seal 35, has a plurality of ports 43 through which fluid flowing upwardly into the tubular portions 33 and 37 will flow into the tube 41. The tube 41 in turn has mounted in fluid-tight relationship thereon the tube or hose 25.

As a further effective means of preventing escape of gas or fluid between the cartridge 30 and the holder 26, the upper wall 45 of the holder may be provided with a circular, downwardly facing groove 38. An elastomer O-ring 39 is fixedly mounted in the groove 38 so that there is a fluid-tight seal when the upper end 40 is tightly compressed against the O-ring 39 when the cartridge 30 is threaded into the holder 26 via the threaded necks 28 and 31.

The embodiment in FIGS. 3–5 may be mounted in any suitable fashion under the hood of the automobile, e.g. by bracket 27 as shown in FIG. 1 or any other holder or hanger. It differs from the embodiment of FIGS. 1 and 2 by the provision of the separate vessel or holder 50 containing only the water, mixture of water and detergent, or mixture of either of the foregoing with the aforesaid antifreeze compounds. In the illustrated case it is a metal or plastic container having a threaded neck 52.

The gaseous propellent is provided by a separate cartridge 51 having at its bottom part a cap portion 53 adapted to be threaded onto the threaded neck 52 in non-airtight relationship. An air vent for vessel 50 may be provided, if necessary. The gaseous propellent cartridge 51 comprises a cartridge 54 having mounted therein a tube 55 extending substantially through the cartridge 54 with the lower portion thereof extending through the bottom of cartridge 54 in gas-tight relationship a distance long enough so that the bottom of the tube 55 will be adjacent the bottom of the vessel 50.

As shown in FIG. 4, the cartridge 54 has an upper metal neck portion 56 in which is seated a tubular, valve body member 57 made of plastic or other suitable material. The upper portion of the valve body 57 has an enlarged upper end 59 and fits securely within the neck 56 to hold the valve body portion 57 in fixed position. The valve structure is a type which is generally known in the art.

The valve body portion has, just below the enlarged upper end 59, a port 58 adapted to align with an annular passage 60 in the axially slidable or movable valve stem or plug 61 when the latter is moved downwardly in the valve body 57. The valve stem 61 has a lower, cylindrical stem portion 62 slidable in the tube 55, the upper end of which is securely mounted in the valve body 57. The stepped intermediate portion 63 is movable in the space 64 when the valve body or plug 61 is depressed. The neck portion 56 is normally sealed against escape of propellent gas by the gasket 65, which seals off the communication between the annular ring 60 and the ports 66 extending upwardly through the upper stem portion 73 of the valve body 61. When the valve body 61 is fully depressed, the gasket 65 is sufficiently distorted so that the propellent gas will flow from the cartridge 54 via passage 58, annular passage 60, and into the passages 66 and 68, the latter ending at wall 72. Three passages 66 and 68 are provided in the upper stem portion 73 whereby, in the illustrated embodiment, three streams of gaseous propellent flow upwardly out of the upper end 72 of the stem 73.

The upper end of the cartridge 71 is threaded and has mounted thereon a threaded cap 70 having a rounded shoulder 74 which is adapted to press down against the peripheral edge of the wall 72 without blockage of the passages 68. Thus by threading the cartridge 54 into the cap 70, the valve body or plug 61 is depressed to a position wherein the system is under pressure of the gaseous fluid. The cap 70 has an upper tube or stem 75 extending from shoulder 74 and is connected in fluid-tight relationship with the solenoid 22. Shoulder 74 is pressed tightly enough against the edge of wall 72 to provide a gas-tight seal therewith.

The gas flow occurs only when solenoid valve 22 is open. The upper end of liquid passage 67 is connected by tube 76 to a T-connection 77 provided in the outlet side of solenoid valve 22. The tube 76 extends through the wall of stem 75 in gas-tight relationship to prevent escape of gaseous propellent change in the stem 75.

When the gas flows through T-connections 77, it has an aspirant effect and draws liquid through tube 55, passage 67, and tube 76 into the gas stream whereby the liquid is conveyed and directed against the windshield via nozzles 14.

Thus, in either embodiment, when the solenoid 22 is opened, the gaseous propellent-liquid washing systems will cause the flow of washing liquid from either the pressurized cartridge 30 or from the vessel 50 through a system as shown in FIG. 1 and onto the windshield. The embodiment of FIGS. 3–5 has the advantage that the replaceable cartridge which has to be purchased by the user need be only that of the gaseous propellent per se and the user can put whatever type of washing liquid he desires into the vessel 50. The cartridge 30, on the other hand, contains both the gaseous propellent and the washing liquid.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. In an automobile windshield washer system wherein a washing liquid is sprayed by a nozzle or nozzles onto the windshield and is conveyed thereto through conduit means from a source of pressurized liquid and embodying a valve operable by the driver of the automobile, the improvement comprising a cylindrical cartridge member containing both gaseous propellent and washing liquid, an open bottom, hollow cartridge holder mounted under the hood of said automobile, a hollow, threaded neck on the upper side of said holder, a threaded neck on said cartridge threaded into said hollow neck to mount said cartridge in said holder, a tubular member extending from the bottom portion of said cartridge through said neck of said cartridge, a puncturable, elastomer seal normally closing the upper end of said tubular member, and a pointed tube mounted in said threaded neck of said holder and connected to said conduit means with its pointed end penetrated through said seal and communicating with the upper end of said tube for conveying gas-propelled washing liquid from said cartridge to said conduit means.

2. In a system as claimed in claim 1, an annular lip on said seal, and wall means on respective necks compressing therebetween said annular lip.

3. In an automobile windshield washer system wherein a washing liquid is sprayed by a nozzle or nozzles onto the windshield and is conveyed thereto through conduit means from a source of pressurized liquid and embodying a valve operable by the driver of the automobile, the improvement comprising employing as the source of pressurized liquid a cartridge member containing a gaseous propellent in liquid-conveying association with the windshield washing liquid and further characterized by a vessel adapted to contain said washing liquid, a separate gaseous propellent cartridge mounted on said vessel, tube means extending from the lower portion of said vessel through said cartridge, release means for releasing gaseous propellent from said cartridge, means for conveying it to said nozzles, aspirant means associated with said last mentioned means to draw liquid from said vessel through tube means, and cap means mounted on end of said cartridge and comprising part of said means for conveying said gaseous propellent.

4. In a system as claimed in claim 3, depressible valve means normally sealing said cartridge against escape of gaseous propellent, and means on said cap means depressing and opening said valve means when said cap means is mounted on said cartridge.

5. In a system as claimed is claim 4, said vessel having a threaded neck, and a threaded cap attached to the bottom of said cartridge and threaded on said neck to mount removably said cartridge on said vessel.

References Cited

UNITED STATES PATENTS

| | | | |
|---|---|---|---|
| 1,899,222 | 2/1933 | Werder | 222—82 |
| 2,373,373 | 4/1945 | Berg | 222—83 |
| 2,744,809 | 5/1956 | Falligant | 222—5 |
| 2,895,651 | 7/1959 | Mahon et al. | 222—194 |
| 3,260,284 | 7/1966 | Kibler et al. | 222—394 X |
| 3,270,919 | 9/1966 | Frangos et al. | 222—82 |
| 3,286,932 | 11/1966 | Kibler | 239—284 |
| 3,356,262 | 12/1967 | Abplanalp | 222—82 |

ROBERT B. REEVES, Primary Examiner

U.S. Cl. X.R.

222—82, 394